(12) United States Patent
Kothari et al.

(10) Patent No.: US 7,945,853 B2
(45) Date of Patent: May 17, 2011

(54) SCRIPT MARKUP

(75) Inventors: Nikhil Kothari, Sammamish, WA (US); Bertrand Le Roy, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1047 days.

(21) Appl. No.: 11/318,305

(22) Filed: Dec. 23, 2005

(65) Prior Publication Data

US 2007/0061708 A1  Mar. 15, 2007

Related U.S. Application Data

(60) Provisional application No. 60/716,293, filed on Sep. 12, 2005.

(51) Int. Cl.
G06F 17/22 (2006.01)
(52) U.S. Cl. ........................................ 715/234
(58) Field of Classification Search .................. 715/234, 715/207
See application file for complete search history.

(56) References Cited

U.S. PATENT DOCUMENTS

| | | | | |
|---|---|---|---|---|
| 5,835,712 | A * | 11/1998 | DuFresne | 709/203 |
| 6,061,698 | A * | 5/2000 | Chadha et al. | 715/207 |
| 6,188,401 | B1 * | 2/2001 | Peyer | 715/805 |
| 6,272,673 | B1 * | 8/2001 | Dale et al. | 717/100 |
| 6,470,349 | B1 * | 10/2002 | Heninger et al. | 707/102 |
| 6,480,865 | B1 * | 11/2002 | Lee et al. | 715/234 |
| 6,493,719 | B1 * | 12/2002 | Booth et al. | 707/103 X |
| 6,594,823 | B1 * | 7/2003 | Corbin et al. | 717/143 |
| 6,691,176 | B1 * | 2/2004 | Narin et al. | 719/318 |
| 6,732,330 | B1 * | 5/2004 | Claussen et al. | 715/234 |
| 6,748,569 | B1 * | 6/2004 | Brooke et al. | 715/207 |
| 6,981,212 | B1 * | 12/2005 | Claussen et al. | 715/205 |
| 7,089,330 | B1 * | 8/2006 | Mason | 715/205 |
| 7,207,000 | B1 * | 4/2007 | Shen et al. | 715/207 |
| 7,594,166 | B1 * | 9/2009 | Ramakrishna et al. | 715/234 |
| 2002/0087630 | A1 * | 7/2002 | Wu | 709/203 |
| 2002/0107892 | A1 * | 8/2002 | Chittu et al. | 707/514 |
| 2002/0147745 | A1 * | 10/2002 | Houben et al. | 707/513 |
| 2002/0165954 | A1 * | 11/2002 | Eshghi et al. | 709/224 |
| 2002/0169806 | A1 * | 11/2002 | Wang et al. | 707/541 |
| 2002/0178182 | A1 * | 11/2002 | Wang et al. | 707/501.1 |
| 2003/0188039 | A1 * | 10/2003 | Liu et al. | 709/315 |
| 2003/0226107 | A1 * | 12/2003 | Pelegri-Llopart et al. | 715/513 |
| 2004/0030717 | A1 * | 2/2004 | Caplin | 707/103 R |
| 2004/0061713 | A1 * | 4/2004 | Jennings | 345/700 |

(Continued)

FOREIGN PATENT DOCUMENTS

WO  99/35802  7/1999

(Continued)

OTHER PUBLICATIONS

Al-Darwish, Pagegen: An Effective Scheme for Dynamic Generation of Web Pages, 2003, Information and Software Technology, vol. 45, pp. 651-662.*

(Continued)

Primary Examiner — Laurie Ries
Assistant Examiner — Frank D Mills
(74) Attorney, Agent, or Firm — Workman Nydegger

(57) ABSTRACT

A script markup language provides a declarative mechanism for defining script-based interactive behavior and application logic associated with a document. The script markup defining the interactive behavior and application logic is presented as an independent portion of the markup for the document, separated from any markup concerning the content and presentation of the document.

12 Claims, 3 Drawing Sheets

U.S. PATENT DOCUMENTS

| | | | |
|---|---|---|---|
| 2004/0111673 A1* | 6/2004 | Bowman et al. | 715/513 |
| 2004/0163036 A1* | 8/2004 | Jung et al. | 715/500.1 |
| 2004/0190861 A1 | 9/2004 | Chung | |
| 2004/0205550 A1* | 10/2004 | Gerken | 715/513 |
| 2004/0216042 A1* | 10/2004 | Consolatti et al. | 715/513 |
| 2004/0225956 A1* | 11/2004 | Beezer et al. | 715/500.1 |
| 2005/0010910 A1* | 1/2005 | Lindhorst et al. | 717/139 |
| 2005/0021756 A1* | 1/2005 | Grant | 709/226 |
| 2005/0044491 A1* | 2/2005 | Peterson | 715/517 |
| 2005/0102611 A1* | 5/2005 | Chen | 715/513 |
| 2005/0160358 A1* | 7/2005 | Gumz et al. | 715/513 |
| 2006/0224978 A1* | 10/2006 | Albrecht et al. | 715/760 |
| 2006/0234548 A1* | 10/2006 | Qing et al. | 439/587 |
| 2006/0265662 A1* | 11/2006 | Gertzen | 715/760 |
| 2007/0050710 A1* | 3/2007 | Redekop | 715/523 |
| 2007/0101322 A1* | 5/2007 | Muschett et al. | 717/168 |
| 2007/0266176 A1* | 11/2007 | Wu | 709/242 |

FOREIGN PATENT DOCUMENTS

| | | |
|---|---|---|
| WO | 01/42977 | 6/2001 |
| WO | 01/57718 | 8/2001 |
| WO | 03036460 A1 | 5/2003 |
| WO | 03100548 A2 | 12/2003 |

OTHER PUBLICATIONS

Meijer et al., Client-Side Web Scripting With Haskellscript, p. 196-210 (Springer-Verlag, Lecture Notes in Computer Science vol. 1551, 1998).*

Manola, Technologies for a Web Object Model, p. 38-47 (IEEE Internet Computing, Jan.-Feb. 1999).*

Eric Ladd & Jim O'Donnel, et al.: "Platinum Edition Using HTML 4, XML and Java 1.2" 1999, Que, USA, SP002591023 ISBSN:0-7897-1759-X, pp. 440-460.

* cited by examiner

```
1    Counter #1: <span id="counterLabel1">0</span><br />
2    Counter #2: <span id="counterLabel2">0</span><br />

3    <script type="text/xml-script">     ~210
4

5         <references>   ~212
6            <add src="../ScriptLibrary/AtlasUI.js" />
7            <add src="../ScriptLibrary/AtlasControls.js" />
8         </references>

9         <components>  ~214
10  302~ <counter id="counter1" />
11  304~ <counter id="counter2" value="10000" />
                     ~306
12         <timer interval="500" enabled="true">
13            <tick>   ~308
14              <invokeMethod target="counter1" method="increment" />
15            </tick>          ~310
16         </timer>
                    ~316
17         <timer interval="500" enabled="true">
18            <tick>~318
19              <invokeMethod target="counter2" method="decrement" />
20            </tick>
21         </timer>
                  ~312
22         <label targetElement="counterLabel1">
23            <bindings>   ~314
24              <binding dataContext="counter1" dataPath="value" property="text" />
25            </bindings>
26         </label>
       320
27         <label targetElement="counterLabel2">
28            <bindings>
29              <binding dataContext="counter2" dataPath="value" property="text" />
30            </bindings>
31         </label>
32       </components>
33     
34  </script>
```

*Fig.3.*

SCRIPT MARKUP

CROSS-REFERENCES TO RELATED APPLICATION

This application claims the benefit of U.S. Provisional Patent Application No. 60/716,293, filed on Sep. 12, 2005, titled "SCRIPT MARKUP," the disclosure of which is hereby expressly incorporated by reference, and the filing date of which is hereby claimed under 35 U.S.C. §119(e).

BACKGROUND

Historically, markup was used to refer to the process of marking manuscript copy for typesetting with directions for formatting such as use of type fonts and sizes, spacing, indentation, etc. In today's digital age, markup refers to electronic markup, i.e., the internal and sometimes invisible codes in an electronic document that describe the formatting of the document. Generally, a user can view the markup of an electronic document by looking at the source code of the document with the browser displaying the electronic document. The electronic markup of a document generally provides encoding of text as well as details about the structure, appearance and presentation of the text and content in the document.

The markup of an electronic document usually is programmed using a markup language. A markup language provides syntax and procedures for embedding in a document tags that control the formatting of the text when the document is viewed by a special application such as a Web browser. Commonly used electronic markup languages include HTML, XML, and ASP.NET. Traditionally, markup languages are used to design the content and appearance of a static document.

However, for an interactive application such as a Web application, the content and/or presentation of a document such as a Web page may change, for example, based on user input. The markup of the document thus needs to be accompanied by information governing the behavior of the document. Traditionally, document behavior has been implemented procedurally in a script. To provide dynamic document behavior, a markup of the document may call on methods in the script at the appropriate time. The intermingling of markup and calls to script methods thus makes it difficult to independently design the markup for a document. Meanwhile, because a script language traditionally has been procedural and imperative, a user of a document usually cannot use the script language to design a specific behavior for the document.

While specific disadvantages of existing systems have been illustrated and described in this Background Section, those skilled in the art and others will recognize that the subject matter claimed herein is not limited to any specific implementation for solving any or all of the described disadvantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the invention make available a script markup language that provides a declarative mechanism for defining script-based interactive behavior and application logic associated with a document. Aspects of the invention also enable the interactive behavior and application logic associated with a document to be defined as an independent layer of the document ("script markup"), separated from markup concerning the content and presentation of the document ("general markup").

One aspect of the invention employs a script markup language to program script markup for a document to define the behavior of the document. The script markup may be included or referenced in a markup document containing markup information for displaying a document. The markup document may further include a general markup portion including one or more general markup elements defining the content and/or the appearance of the document to be displayed. The general markup portion and the script markup portion are separated from each other in the markup document, though the script markup portion may define behaviors of the general markup elements in the general markup portion.

In accordance with another aspect of the invention, the script markup portion includes one or more script markup elements. For example, the script markup elements may include a script element that contains a reference element and a components element. The reference element may include one or more references to script files used by the script markup portion. The components element may define one or more script objects for controlling the behavior of the document to be displayed.

In accordance with yet another aspect of the invention, a script object may contain one or more attributes such as a property attribute, a method attribute, an event attribute, or a reference to another element in the markup document. For example, a script object may reference a general markup element in the general markup portion so the script object can control the behavior of the general markup element. A script object may also reference another script object defined or referenced by the script markup portion. A script object may also contain one or more sub-script objects such as an event object, a binding object, and an action object. An event handler may be provided for an event object. The event handler may connect the script markup with developer-defined code.

In accordance with a further aspect of the invention, a script object may communicate with another script object. For example, a binding object associated with a script object may bind a property of the script object with the property of another script object. In addition, an action object associated with a script object may perform a specific action upon the occurrence of a specific event. The specific action may be to execute a method associated with another script object or to configure a property associated with another script object.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a text diagram illustrating an exemplary markup document implementing aspects of the invention.

DETAILED DESCRIPTION

The following text illustrates and describes exemplary embodiments of the invention. However, those of ordinary skill in the art will appreciate that various changes can be made therein without departing from the spirit and scope of the invention.

Figure 1:
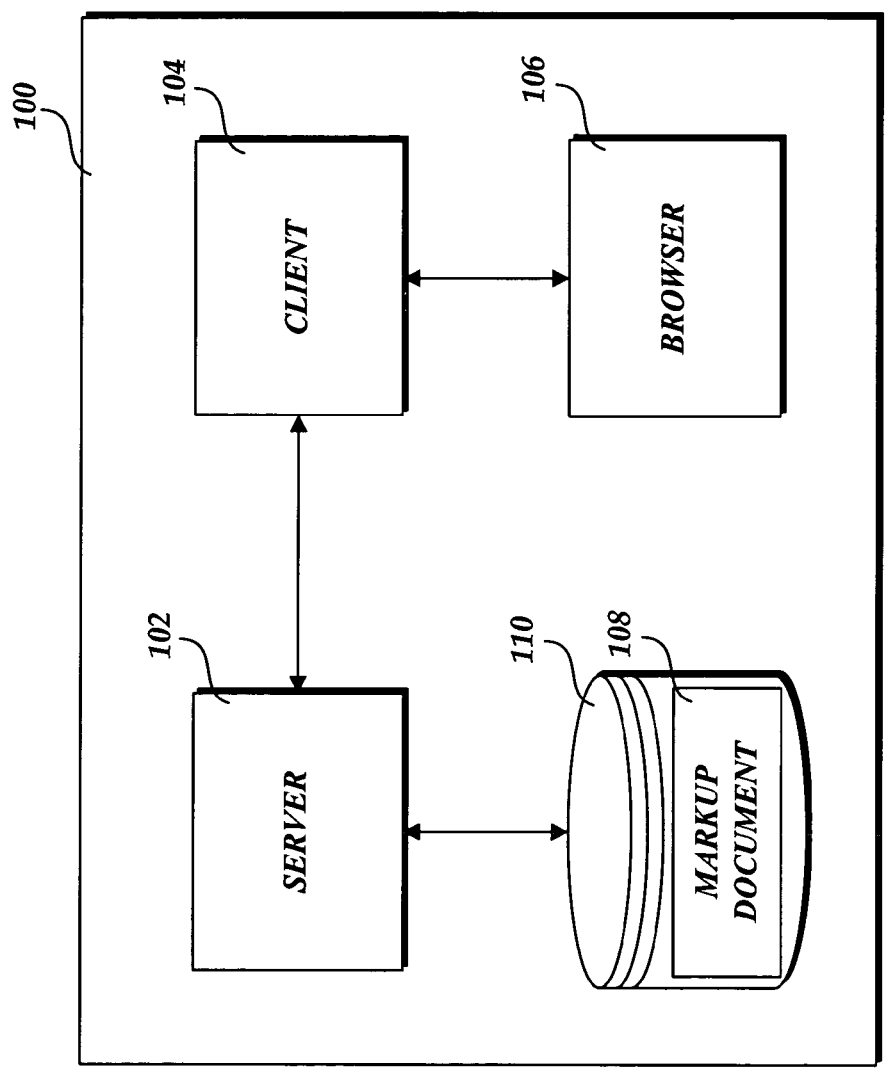
FIG. 1 is a block diagram illustrating an exemplary computing system for implementing aspects of the invention.

FIG. 1 illustrates an exemplary computing system 100 for implementing aspects of the invention. The computing system 100 includes a server component 102 and a client component 104. Generally, a browser 106 is associated with the client 104 for displaying a document such as a Web page. In a typical scenario, when the browser 106 requests to display a document, e.g., a Web page, the client 104 sends a document request to the server 102. The server 102 then sends the client 104 the markup document 108 containing markup information for displaying the requested document. The markup document 108 may exist in a database 110 associated with the server 102. Often, the server 102 and the client 104 exist on the same computer system. Alternatively, they may exist on different computer systems and communicate through a network (not shown).

In embodiments of the invention, upon receiving the markup document 108, the browser 106 parses and interprets the markup document 108 to display the requested document according to the definitions provided in the markup document 108.

Figure 2:
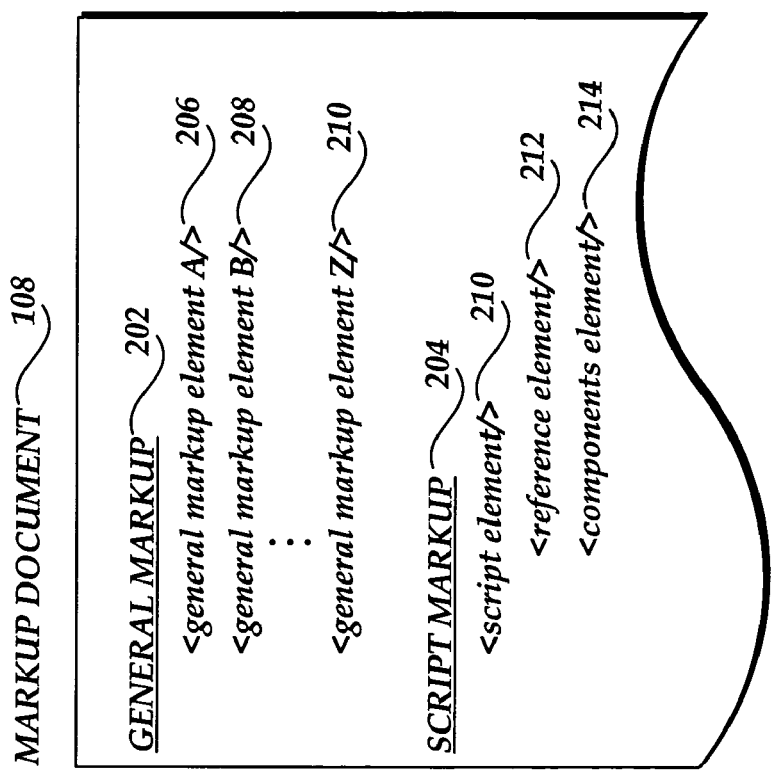
FIG. 2 is a block diagram illustrating an exemplary partition of a markup document according to one aspect of the invention.

In exemplary embodiments of the invention, the markup document 108 for a document such as a Web page provides general markup that defines the content and/or presentation of the document. The markup document 108 further includes or references script markup that defines the behavior of the document. FIG. 2 illustrates exemplary blocks of information presented in the markup document 108. As shown in FIG. 2, the markup document 108 includes a general markup portion 202 and a script markup portion 204.

The general markup portion 202 defines the formatting of the content and/or the overall appearance of the document to be displayed. The general markup portion 202 may define one or more general markup elements. For example, FIG. 2 illustrates that the general markup portion 202 includes multiple general markup elements such as a general markup element A (206), a general markup element B (208), and a general markup element Z (210).

On the other hand, content of the script markup portion 204 defines interactive behavior and application logic associated with the document to be displayed. In embodiments of the invention, the content of the script markup portion 204 defines or references one or more script objects, and instantiates the script objects along with attributes defining the states, property values of the script objects. As shown in FIG. 2, in embodiments of the invention, the script markup portion 204 is separated from the general markup portion 202 and is an independent portion of the markup document 108. Alternatively, in some embodiments of the invention, the script markup portion 204 can be included in a separate file, which is then referenced by the markup document 108. As shown in FIG. 2, the content of the script markup portion 204 includes multiple script markup elements such as a script element 210, a reference element 212, and a components element 214. Both the general markup elements and the script markup elements are called markup elements.

In an exemplary embodiment of the invention, the script element 210 defines the overall scope of the script markup portion 204. All other elements in the script markup portion 204, such as the reference element 212 and the components element 214, are contained within the script element 210. Referring back to FIG. 1, while interpreting the script markup portion 204, the browser 106 navigates through the script element 210 to interpret the included definitions, so to decide the behavior of the document to be displayed.

In embodiments of the invention, the reference element 212 references script files external to the markup documents 108 that are used by markup elements in the markup documents 108. The external script files may detail dependency information that the markup elements may use. Preferably, the external script files may also provide implementation details of script markup elements defined or referenced in the script markup portion 204.

The components element 214 contains one or more script object definitions that actually define the behavior of the document to be displayed. In exemplary embodiments of the invention, one or more of the script objects defined in the components element 214 may reference and hence define behaviors of one or more of the general markup elements included in the general markup portion 202.

FIG. 3 illustrates an exemplary markup document 108 implementing the exemplary markup elements illustrated in FIG. 2. As shown in FIG. 3, the exemplary markup document 108 contains a hierarchical structure, in which one markup element may be contained by another markup element. Each markup element includes tags, as denoted by, for example, < > symbols, with the actual element being detailed between the tags. Each markup element includes a start tag and an end tag, wherein a start tag begins a markup element and an end tag ends the corresponding markup element. For example, as shown in FIG. 3, the script element 210 begins with the start tag < > on line 3 and ends with the end tag </> on line 34. As will be described in detail below, the markup elements in the markup document 108 further contain one or more attributes with assigned values.

The exemplary markup document 108 shown in FIG. 3 illustrates script-defined behavior of two counters. As shown in FIG. 3, lines 1-2 illustrate an exemplary general markup portion 202. Here, two general markup elements—Counter#1 and Counter#2—are defined, wherein Counter#1 has an "id" attribute with the value "counterLabel1" and Counter#2 has an "id" attribute with the value "counterLabel2."

Lines 3-34 illustrate an exemplary script markup portion 204 that specifies the behavior of the two counters defined in lines 1-2. Specifically, line 3 signals the beginning of a definition for an exemplary script element 210 and line 34 signals the end of the definition. The exemplary script element 210 includes an exemplary reference element 212 (lines 5-8) that links In two JavaScript markup language script files-AtlasUI.js and AtlasControls.js. Lines 9-32 illustrate an exemplary components element 214 that defines a plurality of script objects. For example, line 10 defines a script object Counter 302 that is identified as "counter1," while line 11 defines a script object Counter 304 that is identified as "counter2" and has a value of "10000." The code between lines 12-16 and lines 17-21 each defines a script object Timer (306, 316) that periodically, e.g., every 500 seconds, enables an event object Tick (308, 318). In embodiments of the invention, a script object may include one or more sub-script objects. For example, the script object Timer 306 includes an event object Tick 308, which further includes an action object invoke Method 310. For another example, the script object Label 312 defined in lines 22-26 includes a binding object 314.

In exemplary embodiment of the invention, a script object may be associated with one or more attributes whose values are used to define the behavior of the script object. An attribute can be, for example, a property, a method, or an event associated with the script object. An attribute may also be a reference to another markup element. For example, the script object Counter 304 defined in line 11 has a property attribute "id" and a property attribute "value". The action object invoke Method 310 defined in line 14 has an method attribute "Method" that is set to an exemplary "increment" method. For example, instead of using an event object Tick 308, the script object Timer 306 may have an event attribute "Tick". The script object Label 312 defined in line 22 has an attribute "targetElement" that references the general markup element Counter#1 identified as "counterLabel" in line 1.

In exemplary embodiments of the invention, a script object may reference a general markup element defined in the general markup portion 202 of the markup document 108 and define document behavior associated with the referenced general markup element. For example, the code between lines 22-26 defines a script object Label 312 that references the general markup element Counter#1 defined in line 1. The code between lines 27-31 defines a script object Label 320 that references the general markup element Counter#2 defined in line 2. Consequently, the script objects Label 312 and Label 320 may specify the behaviors of the general markup elements Counter#1 and Counter#2 in the general markup portion 202.

In embodiments of the invention, a script object may communicate with another script object by performing a specific action upon occurrence of a specific event. For example, in embodiments of the invention, a script object may be associated with an event, the occurrence of which initiates a corresponding event handler, which may link to developer-defined code for markup elements in the markup document 108. In an exemplary embodiment of the invention, the event handler includes one or more specific actions to be performed on one of the script objects in the components element 214. An exemplary action can be to invoke a method associated with another script object. Another exemplary action can be to configure a property associated with another script object. In a typical embodiment of the invention, both the event and the action are also script objects including one or more attributes. For example, the script object Timer 306 contains an event object Tick 308, the enablement of which initiates an action object invokeMethod 310. The action object invokeMethod 310 has an attribute "target" specifying a target script object—"counter1", for example—and an attribute "method" specifying the function to be performed on the target script object.

Another exemplary mechanism for one script object to communicate with another script object is a binding mechanism that connects a property of one script object with a property of another script object; the change of one property thus is reflected on the other property. For example, as shown in FIG. 3, the script object Label 312 includes a binding object 314. The binding object 314 has an attribute "dataContext" that specifies the script object and an attribute "dataPath" that specifies one of the script object's properties with which the script object Label 312 will bind its property "text". As a result of the binding, the value of the script object Counter 302 defined in line 10 is reflected in the "text" property associated with the script object Label 312 and hence is displayed in the general markup element Counter# 1 defined in line 1. In an exemplary embodiment of the invention, a binding object provides a transform functionality that transforms the type of the property that provides the data into the type of the property that receives the data. For example, the transform functionality for the binding object 314 may convert the type of the property specified by "dataPath" into the type of the property specified by "text".

It is to be understood that FIG. 3 illustrates only exemplary formats of a script markup language for implementing aspects of the invention. These exemplary formats should be used for illustration purposes only. These exemplary formats do not limit the script markup language offered by embodiments of the invention to the specific formats, syntax, and functionalities illustrated. For example, the exemplary markup document 108 has been illustrated using XML syntax and formats. However, those of ordinary skill in the art will appreciate that aspects of the invention may be implemented in different markup languages such as HTML, ASP.NET, JavaScript Object Notation, etc.

In embodiments of the invention, a developer may custom define a script object model. The script object model, for example, specifies attributes, such as property, method, and/or event attributes, and any sub-script object models that may be associated with the script object model. The script object model then is registered with the browser 106, for example, through a type manager associated with the browser 106. The browser 106 thus knows how to interpret and process a script object instantiated based on the script object model. As a result, the script markup language provided by aspects of the invention is extensible in that new script object models can be defined and registered with a browser for interpreting script markups containing script objects instantiated based on the script object models.

Although aspects of the invention have been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The embodiments of the invention in which an exclusive property or privilege is claimed are defined as follows:

1. A computer program product comprising a computer storage medium containing computer-executable instructions for implementing a method which facilitates designing the markup for an electronic document such as a Web page which is stored as a markup document in a database associated with a server computing system, and which is later retrieved for viewing and design of the markup document at a browser of a client computing system, and wherein the method facilitates the design by separating script markup language that defines interactive behavior and application logic associated with the electronic document from general markup language of the electronic document that defines content and presentation of the electronic document, the method comprising:

receiving input at a type manager associated with a browser for registering a custom script object model, the custom script object model containing one or more user defined attributes comprising properties, methods, or event attributes for use by the browser in interpreting script objects that conform to the custom script object model and that are contained within electronic documents that are executed by the browser;

registering the custom script object model with the browser to enable the browser to interpret script objects that conform to the custom script object model;

retrieving from a database associated with a server computing system an electronic document stored in the form of a markup document, for display at the browser of a client computing system, the retrieved electronic document having a markup language that defines in a first part of the retrieved electronic document a general markup portion comprised of one or more general markup elements that define formatting of the content and/or the overall appearance of the electronic document when displayed on a Web page, the retrieved electronic document having a markup language that defines in a second part of the same retrieved electronic document a script markup portion comprised of a reference element and a components elements, wherein the reference element references script files external to the retrieved electronic document, and wherein the components element contains one or more script objects for implementing interactive behavior and application logic associated with the electronic document when displayed as a Web page, wherein at least one of the script objects is a custom script object that conforms to the custom script object model that was registered with the browser;

upon retrieving the electronic document, processing the components element to instantiate the one or more script objects, including accessing the custom script object model to determine how to instantiate the at least one script object that conforms to the custom script object model registered with the browser;

wherein one or more of the script markup elements of the script markup portion reference at least one general markup element contained in the general markup portion of the retrieved electronic document, but script elements of the script markup portion are not referenced by any of the general markup elements of the general markup portion of the retrieved electronic document so that the script portion of the retrieved document is kept separate from the general markup portion when presented for viewing and design on a browser of a client computing system;

presenting the retrieved document for display at the browser of the client computing system with the separate general and script markup portions;

receiving user input that interacts with a portion of the displayed document that is represented by one or more general markup elements, and in response, accessing the custom script object model to perform functionality defined by one or more attributes associated with a custom script object that references the one or more general markup elements; and performing the functionality to modify the appearance of the portion of the displayed document that is represented by the one or more general markup elements.

2. The computer program product of claim 1, wherein one of the one or more script objects references one of the one or more general markup elements in the general markup portion.

3. The computer program product of claim 2, wherein one of the one or more script objects includes one or more sub-script objects.

4. The computer program product of claim 3, wherein one of the sub-script objects is a binding object for connecting an attribute of the script object with an attribute of another script object, wherein both attributes are property attributes.

5. The computer program product of claim 4, wherein the binding object includes a function for converting type of the attribute of the script object into type of the attribute of the another script object.

6. The computer program product of claim 3, wherein one of the sub-script objects is an event object.

7. The computer program product of claim 6, wherein the event object further includes an event handler detailing what to do when the event occurs.

8. The computer program product of claim 7, wherein the event handler includes an action object that initiates a specific action when the event occurs.

9. The computer program product of claim 8, wherein the action involves executing an attribute of another script object, wherein the attribute is a method attribute.

10. The computer program product of claim 9, wherein the action involves configuring an attribute of another script object, wherein the attribute is a property attribute.

11. The computer program product of claim 1 wherein the custom script object model further specifies a sub-script object model that is associated with the custom script object model.

12. A method which facilitates designing the markup for an electronic document such as a Web page which is stored as a markup document in a database associated with a server computing system, and which is later retrieved for viewing and design of the markup document at a browser of a client computing system, and wherein the method facilitates the design by separating script markup language that defines interactive behavior and application logic associated with the electronic document from general markup language of the electronic document that defines content and presentation of the electronic document, the method comprising:

receiving input at a type manager associated with a browser for registering a custom script object model, the custom script object model containing one or more user defined attributes comprising properties, methods, or event attributes for use by the browser in interpreting script objects that conform to the custom script object model and that are contained within electronic documents that are executed by the browser;

registering the custom script object model with the browser to enable the browser to interpret script objects that conform to the custom script object model;

retrieving from a database associated with a server computing system an electronic document stored in the form of a markup document, for display at the browser of a client computing system, the retrieved electronic document having a markup language that defines in a first part of the retrieved electronic document a general markup portion comprised of one or more general markup elements that define formatting of the content and/or the overall appearance of the electronic document when displayed on a Web page, the retrieved electronic document having a markup language that defines in a second part of the same retrieved electronic document a script markup portion comprised of a reference element and a components element, wherein the reference element references script files external to the retrieved electronic document, and wherein the components element contains one or more script objects for implementing interactive behavior and application logic associated with the electronic document when displayed as a Web page, wherein at least one of the script objects is a custom script object that conforms to the custom script object model that was registered with the browser;

upon retrieving the electronic document, processing the components element to instantiate the one or more script objects, including accessing the custom script object model to determine how to instantiate the at least one script object that conforms to the custom script object model registered with the browser;

wherein one or more of the script markup elements of the script markup portion reference at least one general markup element contained in the general markup portion of the retrieved electronic document, but script elements of the script markup portion are not referenced by any of the general markup elements of the general markup portion of the retrieved electronic document so that the script portion of the retrieved document is kept separate from the general markup portion when presented for viewing and design on a browser of a client computing system;

presenting the retrieved document for display at the browser of the client computing system with the separate general and script markup portions;

receiving user input that interacts with a portion of the displayed document that is represented by one or more general markup elements, and in response, accessing the custom script object model to perform functionality defined by one or more attributes associated with a custom script object that references the one or more general markup elements; and performing the functionality to modify the appearance of the portion of the displayed document that is represented by the one or more general markup elements.

* * * * *